United States Patent
Benslimane et al.

(10) Patent No.: US 12,366,589 B2
(45) Date of Patent: Jul. 22, 2025

(54) EMBEDDED ARTIFICIAL INTELLIGENCE AUGMENTED SENSORS

(71) Applicant: Schlumberger Technology Corporation, Sugar Land, TX (US)

(72) Inventors: Salma Benslimane, Menlo Park, CA (US); Ana Escobar, Bagneux (FR); Remi Robutel, Versailles (FR); Laurent Laval, Verrieres le Buisson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 407 days.

(21) Appl. No.: 17/932,398

(22) Filed: Sep. 15, 2022

(65) Prior Publication Data
US 2024/0103036 A1    Mar. 28, 2024

(51) Int. Cl.
G01P 15/18    (2013.01)
G01F 15/18    (2006.01)
G06N 20/00    (2019.01)

(52) U.S. Cl.
CPC .......... *G01F 15/18* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,605,544 B1 | 12/2013 | Baig et al. | |
| 2012/0130693 A1* | 5/2012 | Ertas | E21B 44/00 703/2 |
| 2018/0024263 A1* | 1/2018 | Aarre | G01V 1/364 367/43 |
| 2018/0045850 A1 | 2/2018 | Smidth et al. | |
| 2019/0360320 A1 | 11/2019 | Hohl | |
| 2021/0247534 A1* | 8/2021 | Bø | G06N 20/10 |
| 2021/0270127 A1 | 9/2021 | Zhu et al. | |

OTHER PUBLICATIONS

Ballard et al., 2021, Machine learning and computation-enabled intelligent sensor design, Nature Machine Intelligence vol. 3, pp. 556-565 (2021).

(Continued)

*Primary Examiner* — Raymond L Nimox
(74) *Attorney, Agent, or Firm* — Jeffrey D. Frantz

(57) ABSTRACT

A method, sensor, and non-transitory computer-readable storage medium are provided for estimating actual amplitudes of a waveform. A machine learning model may be trained for an embedded system of a first three-axes sensor having a limited range to estimate the actual amplitudes of a waveform that saturates the first three-axes sensor in a direction of one of the three axes. The embedded system acquires a second waveform during use of a tool including the first three-axes sensor. The second waveform that occurs after a second waveform producing event is isolated. The embedded system extracts a multi-dimensional feature from the isolated second waveform and estimates, using the machine learning model, the actual amplitudes of the second waveform based on the extracted multi-dimensional feature.

20 Claims, 15 Drawing Sheets

(56) References Cited

OTHER PUBLICATIONS

Ignova et al., 2019, Recognizing Abnormal Shock Signatures During Drilling with Help of Machine Learning, Paper presented at the SPE Middle East Oil and Gas Show and Conference, Manama, Bahrain, Mar. 2019. Paper No. SPE-194952-MS, Published: Mar. 15, 2019 (15 pages).
Smart Sensor BNO055 _ Bosch Sensortec, downloaded on Jan. 27, 2023 from https://www.bosch-sensortec.com/ products/smart-sensors/ bno055/ (10 pages).
International Search Report and Written Opinion issued in the PCT Application PCT/US2023/032486 dated Jan. 2, 2024, 9 pages.

\* cited by examiner

EMBEDDED ARTIFICIAL INTELLIGENCE AUGMENTED SENSORS

BACKGROUND

In the oil and gas industry, environmental conditions that may impact operation and integrity of a drilling tool are monitored during drilling and large downhole operations. Sensors, such as shock sensors used in drilling tools, can suffer from a limitation in resolution and provide limited information about movement and dynamics of the tool. New low-cost sensors can provide a higher response in resolution and bandwidth, but may become saturated under high shock conditions that may occur during drilling operations. Sensors that provide high resolution and high frequency sampling responses and that would not become saturated during drilling operations are either unavailable for downhole operations or are very expensive compared to the new low cost sensors.

SUMMARY

Embodiments of the disclosure may provide a method for estimating actual amplitudes of a waveform. A machine learning model for an embedded system of a first three-axes sensor is trained to estimate the actual amplitudes of a waveform that saturates the first three-axes sensor in an axial direction. The embedded system acquires a second waveform during use of a tool that includes the first three-axes sensor. The embedded system isolates the second waveform that occurs after a second waveform producing event. A multi-dimensional feature is extracted from the isolated second waveform. The actual amplitudes of the second waveform are estimated by the embedded system using the machine learning model based on the extracted multi-dimensional feature.

In an embodiment of the method, the training of the machine learning model of the embedded system may include acquiring, by the machine learning model for the embedded system, the waveform from test data. The waveform includes first amplitudes of the waveform from the first three-axes sensor. The test data further includes actual amplitudes of the waveform from a second three-axes sensor having a broader dynamic range than the first three-axis sensor, and that, in the test data, did not get saturated along any of the three axes. The embedded system isolates the waveform of the first three-axes sensor that occurs after a waveform producing event. A multi-dimensional feature is extracted from the isolated waveform. The embedded system estimates, using the machine learning model, the actual amplitudes of the waveform based on the extracted multi-dimensional feature. The acquiring, the isolating, and the extracting are repeated for a next waveform from the test data until all of the waveforms including the first amplitudes have been acquired by the machine learning model. Weights of the machine learning model are adjusted to reduce an error between the estimated actual amplitudes of the waveform and the corresponding actual amplitudes of the waveform. The acquiring, the isolating, the extracting, the estimating, the repeating of the acquiring, and the adjusting of the weights are repeated until a desired level of accuracy is achieved.

In an embodiment of the method, low-pass filtering using either a sliding average or a Butterworth filter up to a sixth order may be performed.

In an embodiment of the method, the extracting of the multi-dimensional feature from the isolated second waveform may include calculating a root mean square of the isolated second waveform in each of the axial directions.

In an embodiment of the method, the second waveform producing event is a shock. The extracting of the multi-dimensional feature from the isolated second waveform further includes calculating a shock energy of the second waveform based on a sum of the root mean square in all of the three axes for data points of the second waveform.

In an embodiment of the method, the embedded system calculates inputs to the machine learning model based on a root mean square in each of the three axial directions divided by a square root of the shock energy.

In an embodiment of the method, the machine learning model is a convolutional neural network that includes one-dimensional convolutional layers followed by activation functions and grouping functions.

Embodiments of the disclosure may also provide a three-axes sensor for estimating actual amplitudes of a waveform, wherein the three-axes sensor has a limited dynamic range. The three-axes sensor includes a microcontroller unit that has a memory with instructions recorded therein for the microcontroller unit. When the instructions are executed by the microcontroller unit, the microcontroller unit performs a number of operations. According to the operations, an embedded system of the microcontroller unit acquires a waveform during use of a tool that includes the three-axes sensor. The embedded system isolates the waveform that occurs after a waveform producing event and extracts a multi-dimensional feature from the isolated waveform. Using a machine learning model, the embedded system estimates the actual amplitudes of the waveform based on the extracted multi-dimensional feature.

Embodiments of the disclosure may further provide a non-transitory computer-readable storage medium having instructions recorded thereon for a microcontroller. When the instructions are executed by the microcontroller, the microcontroller performs a number of operations. According to the operations, a waveform is acquired during use of a tool that includes the three-axes sensor. The embedded system isolates the waveform that occurs after a waveform producing event and extracts a multi-dimensional feature from the isolated waveform. Using a machine learning model, the embedded system estimates the actual amplitudes of the waveform based on the extracted multi-dimensional feature.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
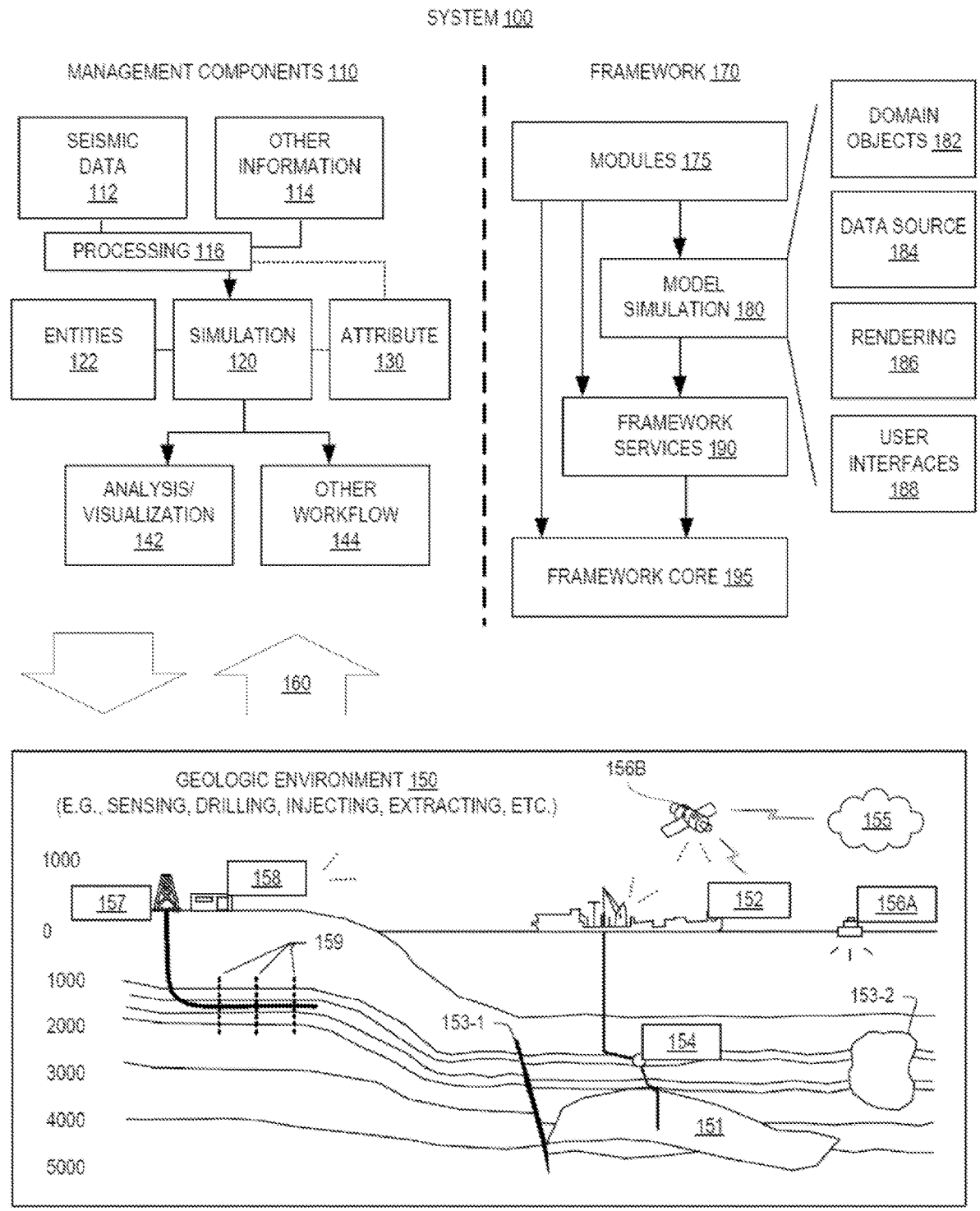
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
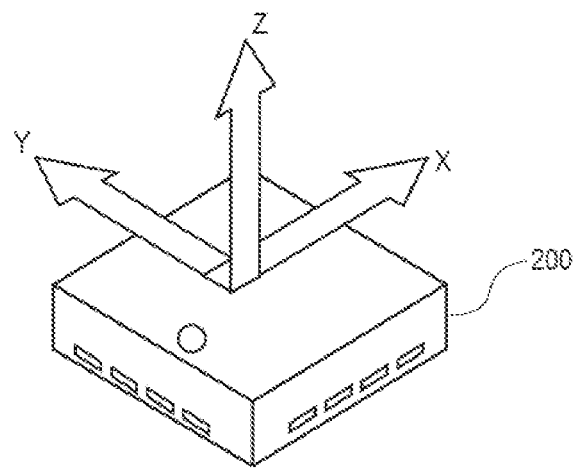
FIG. 2 illustrates a new low-cost sensor having an embedded system.

FIG. 2 illustrates a sensor such as, for example, a shock sensor 200. The shock sensor 200 may be a three-axes sensor that provides a high-resolution amplitude measurement of a shock along each of the three axes, X, Y, and Z, where X and Y are in a horizontal plane, and Z is normal to the horizontal plane. The sensor 200 may be digital, and may be smaller and less expensive (e.g., about ten times smaller, and 10-100 times less expensive), and consume about ⅒ the power of currently used sensors. However, the sensor 200 can become saturated during drilling operations resulting in a truncated amplitude response along any one of the three axes. For example, sensor 200 may be capable of measuring shock up to 200 g, or in some cases, up to 400 g. Oil and gas applications, however, generally call for sensors capable of measuring up to 500 g or more, and thus may exceed the sensor 200 capabilities, which may result in the aforementioned saturation during use.

Figure 3:
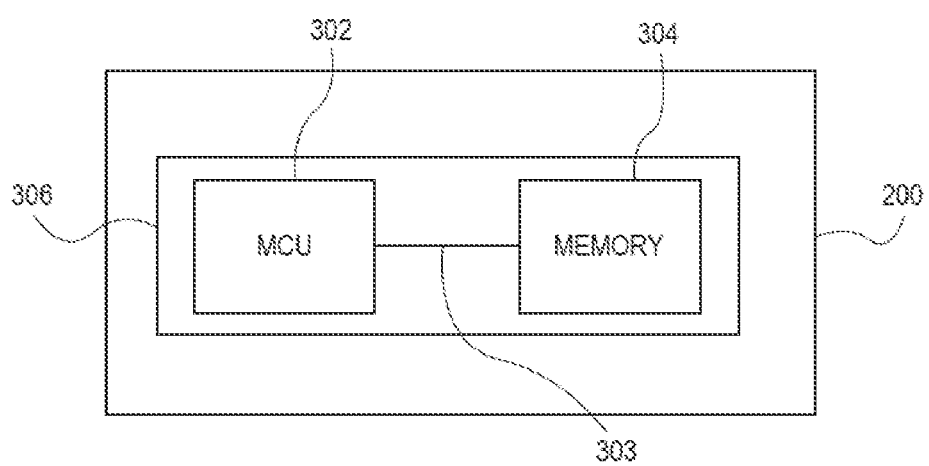
FIG. 3 shows the embedded system of the new low-cost sensor of FIG. 2.

The sensor 200 may include an embedded system, which may be a "System-in-package" (SiP) with processing capabilities. FIG. 3 illustrates the sensor 200 with an embedded system, or SiP 306. Embedded system 306 may include a microcontroller unit (MCU) 302 and one or more memory modules 304 connected to MCU 302 via a data communication bus 303. Memory modules may include one or more dynamic random access memory (DRAM) modules and one or more read only memory (ROM) modules. The ROM memory modules may have program instructions stored therein, while the DRAM memory modules may be used to store data such as intermediate results as well as other data.

The approach used in various embodiments to estimate a value of the amplitude beyond a saturation point is referred to as "TinyML", which is a lightweight, fast approach of machine learning (ML) techniques that is appropriate for sensors and Internet of Things (IoTs) devices. ML models developed as a result of using TinyML provide an estimate of actual environmental conditions such as shock. The ML models may be configured to enhance performance of miniaturized microelectromechanical (MEMS) sensors, such as the sensor 200 of FIG. 2.

Due to its limited measurement range, the sensor 200 may suffer from saturation in the drilling environment, as discussed above. Thus, the sensor 200 may provide a clipped value not representative of an actual shock value when a shock having a peak value beyond the limited range occurs. However, a TinyML machine learning model may be implemented in embedded system 306 of the sensor 200 to account for this possibility. The ML model may be based on either classification or regression algorithms.

Figure 4:
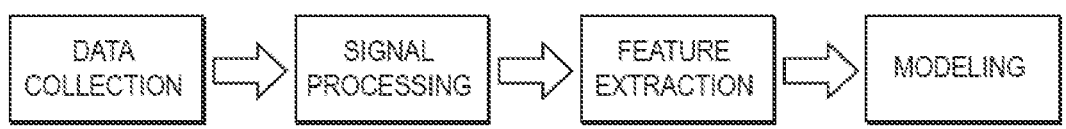
FIG. 4 shows an example model design flow that may be implemented in some embodiments.

FIG. 4 illustrates an example model design flow that may be implemented in various embodiments. Data collection refers to acquisition by a three-axes low cost sensor, or accelerometer, used to assess a downhole shock environment. Collected acquired signals may be preprocessed. The signal preprocessing may include data filtering and data formatting. Results of the signal preprocessing then may have features extracted in order to compute a multi-dimensional feature to be used as input to a ML model. Modeling includes a selection, design, and application of a ML algorithm to build the model and train the model via supervised machine learning.

Data Collection

To train a supervised ML model, a reference value and three-axes sensor data from the sensor 200 may be simultaneously acquired on a dedicated set up. The reference value may be acquired by a more expensive sensor that does not become saturated during testing. The reference value and the data may be acquired during specific tests or during sensor qualification tests. Once the ML model is built, data may be collected and the ML model may be applied to estimate for example, a shock level, when the new low-cost sensor becomes saturated.

Signal Processing

Because raw data may be difficult to be directly ingested, a process may be performed to extract relevant data from the raw data. For example, the sensor 200 may acquire waveforms from each axis (X, Y, Z in a three-dimensional coordinate system). Embedded software executed by the MCU 302 may isolate shock sensor waveforms that occur after a shock. Thus, the waveform may be recorded by the MCU 302.

The MCU 302 may perform other computations such as, for example, scale factor computations, low-pass filtering at about 8 kHz using a digital low-pass filter implementation such as a sliding average for a Butterworth filter up to a $6^{th}$ order.

Time series are time domain waveforms, which are truncated to keep a beginning of the waveform and remove later segments. A shock event (e.g., a waveform producing event) may be detected by using a threshold that is set at a specific value defined for an application. For drilling tools, the threshold may be defined from 20 g to 50 g. Waveform acquisition may be set to 20 ms.

Bias drift of the sensor may occur over time or due to harsh conditions. Bias drift may be detected as an offset to the shock value when the sensor is in an idle state. When this occurs, an offset in the waveform may be removed. In one embodiment, to remove the bias drift an average value of the waveform is removed to better center the waveform around 0 g.

Figure 5:
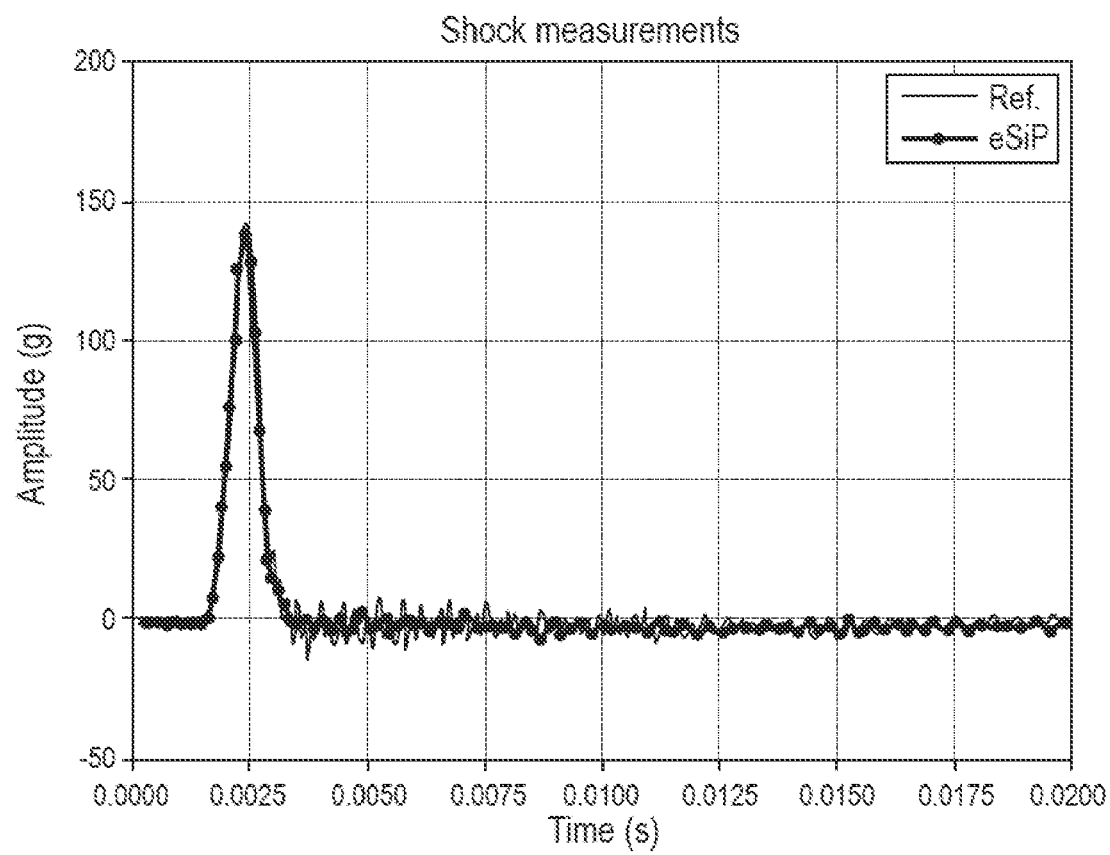
FIG. 5 is a plot of a non-saturated waveform as recorded by a reference sensor and as recorded by the new low-cost sensor.

FIG. 5 shows a plot of a non-saturated waveform.

Figure 6:
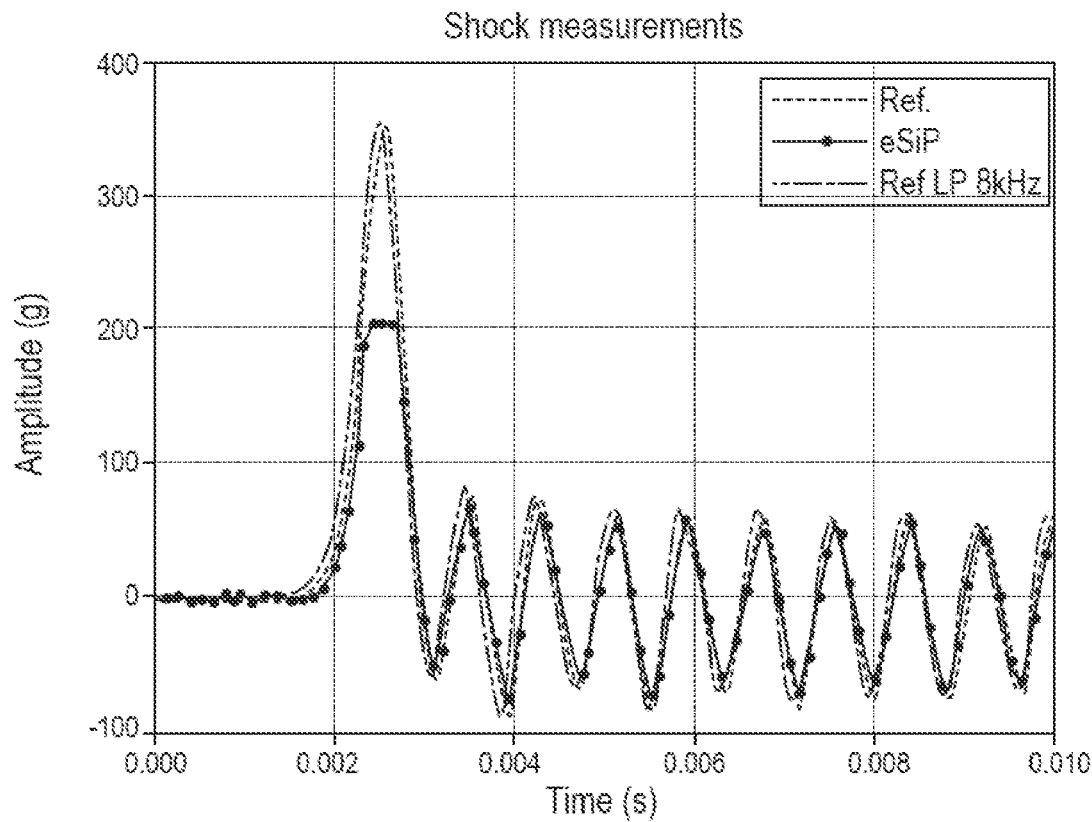
FIG. 6 is a plot of a saturated waveform as recorded by a reference sensor and as recorded by the new low-cost sensor.

FIG. 6 shows a plot of a saturated waveform. Note that the eSip sensor 200 becomes saturated at about 200 g, while the reference sensor measures a peak amplitude of about 350 g.

Figure 7:
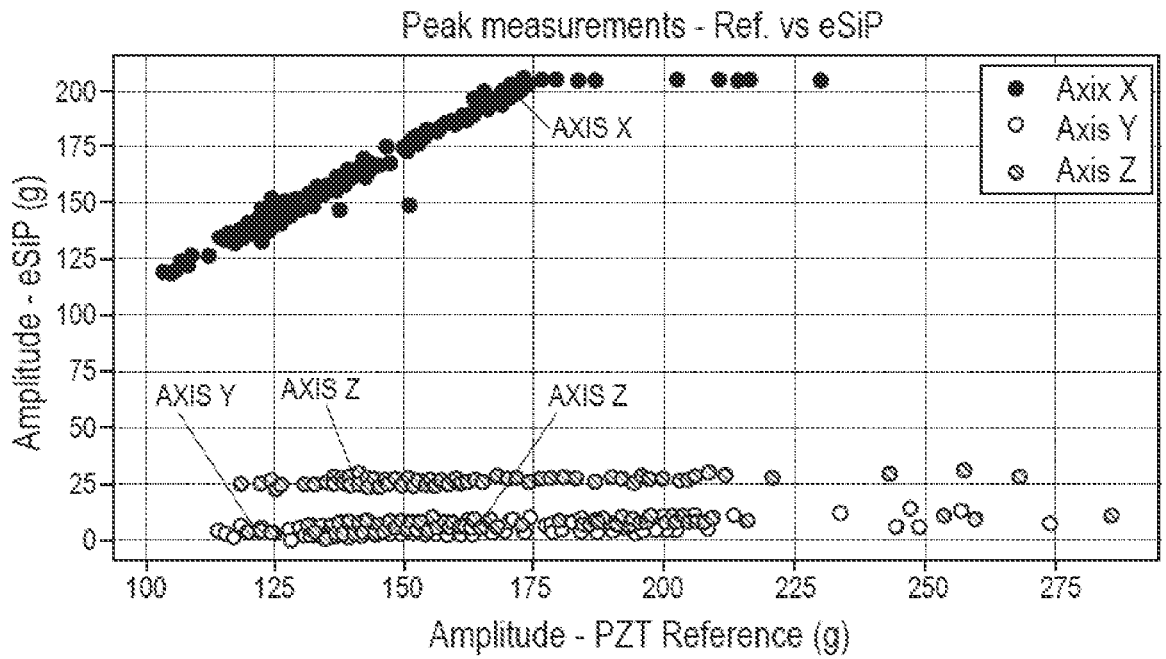
FIG. 7 shows a plot of the three-axes of the low-cost sensor that becomes saturated along the X axis at about 200 g.
Figure 8:
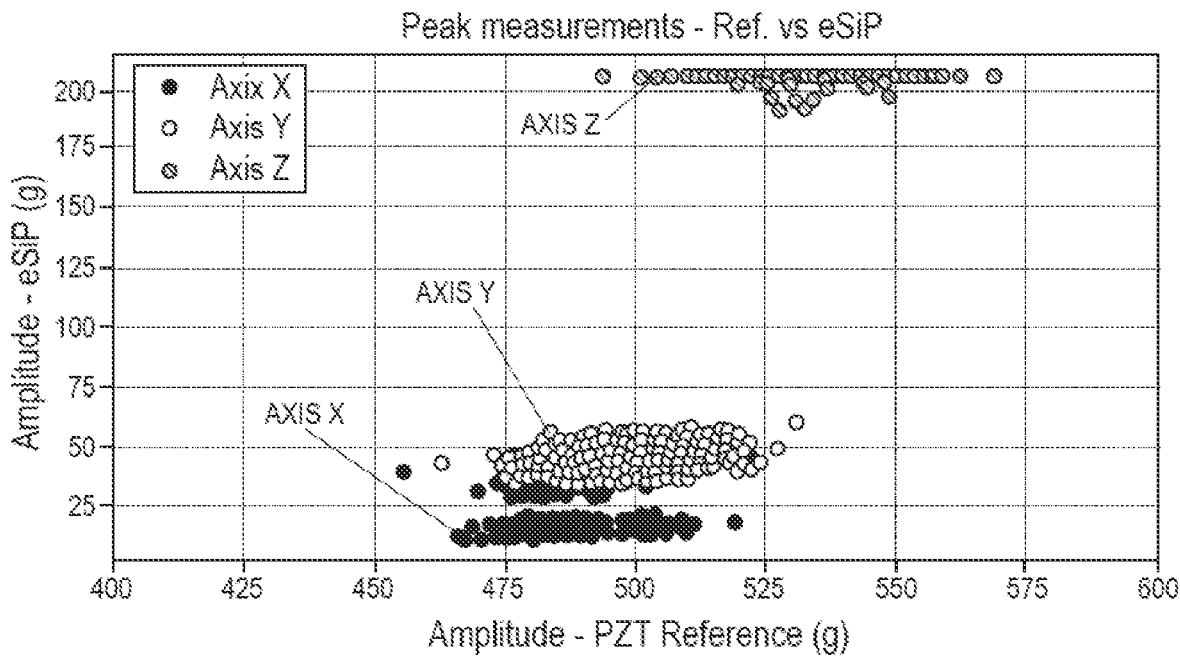
FIG. 8 shows a plot of the three-axes of the low-cost sensor that becomes saturated along the Z axis at about 200 g.

FIG. 7 illustrates a plot in which the X axis of the eSip sensor 200 becomes saturated at about 200 g. FIG. 8 illustrates a plot in which the Z axis of the eSiP sensor 200 become saturated at about 200 g.

One feature that may be extracted from a non-biased waveform for each axis (X axis, Y axis, Z axis, separately) is a root mean square (RMS) according to:

$$RMS = \sqrt{\frac{1}{n} \times \left(\sum_{i=0}^{n-1} a_i^2 dt\right)},$$

Where $a_i$ is an $i^{th}$ sample of the waveform of the a axis (a=X axis, Y axis, or Z axis), dt is an acquisition period, and n is a number of points of a time series of the waveform.

Figure 9:
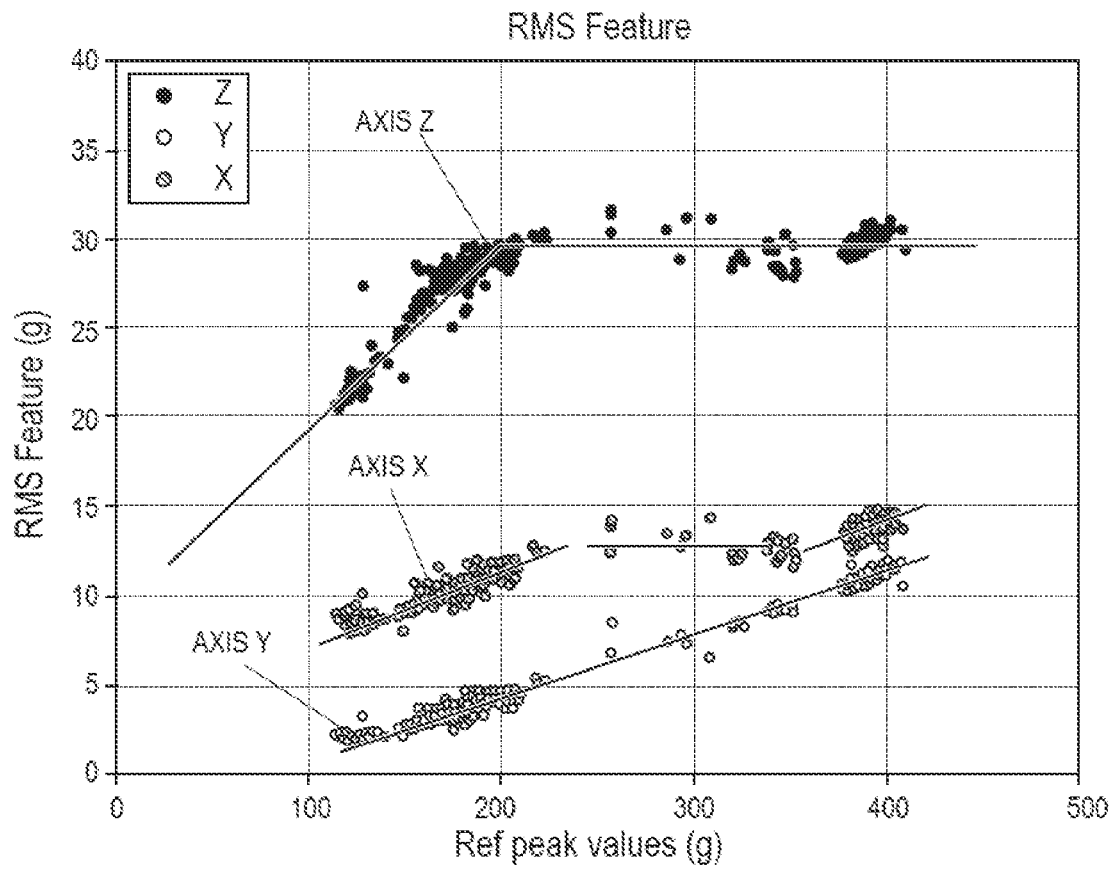
FIG. 9 shows a plot of a waveform in which amplitude along the Z axis is saturated at an RMS value close to 30.

FIG. 9 shows a plot of a waveform in which amplitude along the Z axis becomes saturated. A vertical axis shows a value of RMS and a horizontal axis shows peak values along the Z axis recorded by the reference sensor. As shown, the RMS for the Z axis becomes saturated at a value close to 30. The X and Y axes continue to show an increase in RMS as the actual shock stimuli (Ref. peak value) increases.

Figure 10:
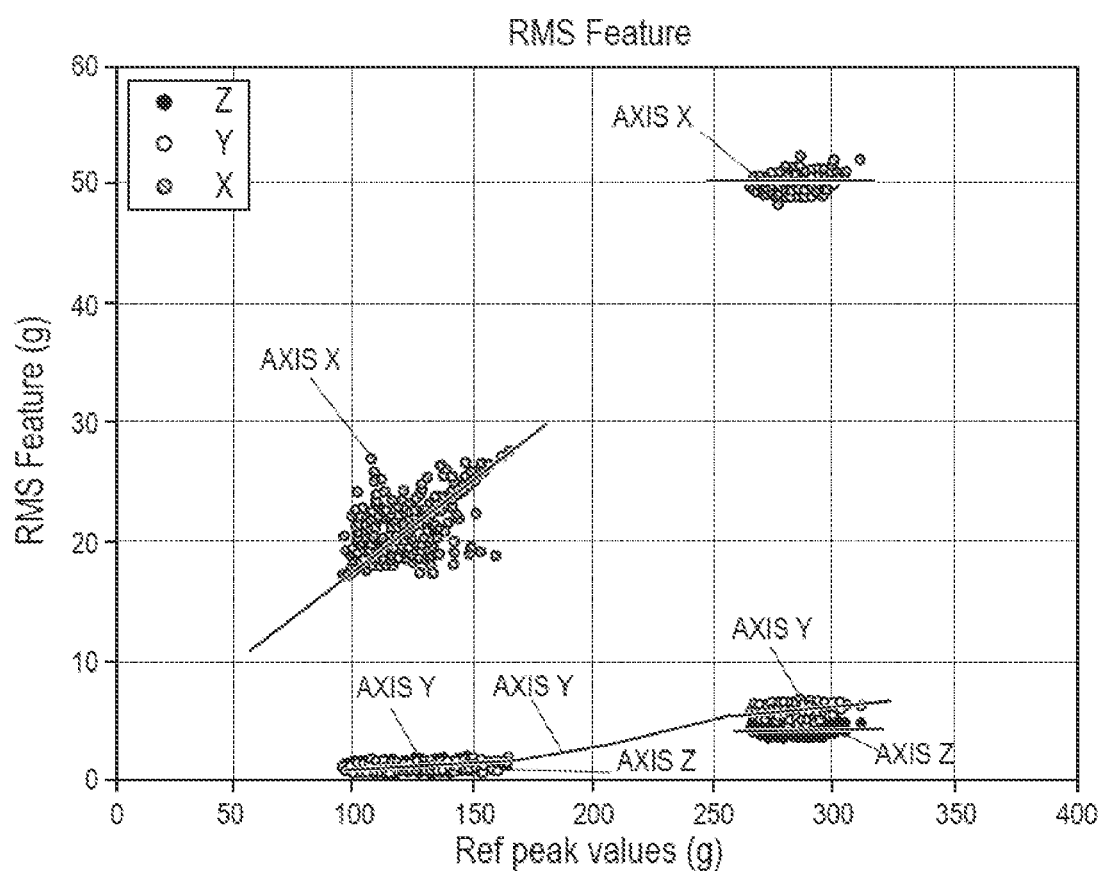
FIG. 10 shows a plot of a waveform in which amplitude along the X axis is saturated at an RMS value of about 50.

FIG. 10 shows a plot of a waveform in which amplitude along the X axis becomes saturated. A vertical axis shows a value of RMS and a horizontal axis shows peak values along the X axis recorded by the reference sensor. As shown, the RMS for the X axis becomes saturated at a value close to 50. The Y and Z axes continue to show an increase in RMS as the actual shock stimuli (Ref. peak value) increases.

Another feature that may be extracted from the non-biased waveform is shock energy, which represents energy of a shock. The shock energy of the shock is based on a sum of RMS values for each of the samples of the waveform (the three axes are combined) according to:

$$\text{Shock Energy} = \Sigma_{i=0}^{n-1} \sqrt{(x_i^2 + y_i^2 + z_i^2)},$$

where $x_i$, $y_i$, and $z_i$ represent the amplitude value for the X axis, the Y axis, and the Z axis, respectively, for an $i^{th}$ sample of the waveform.

Figure 11:
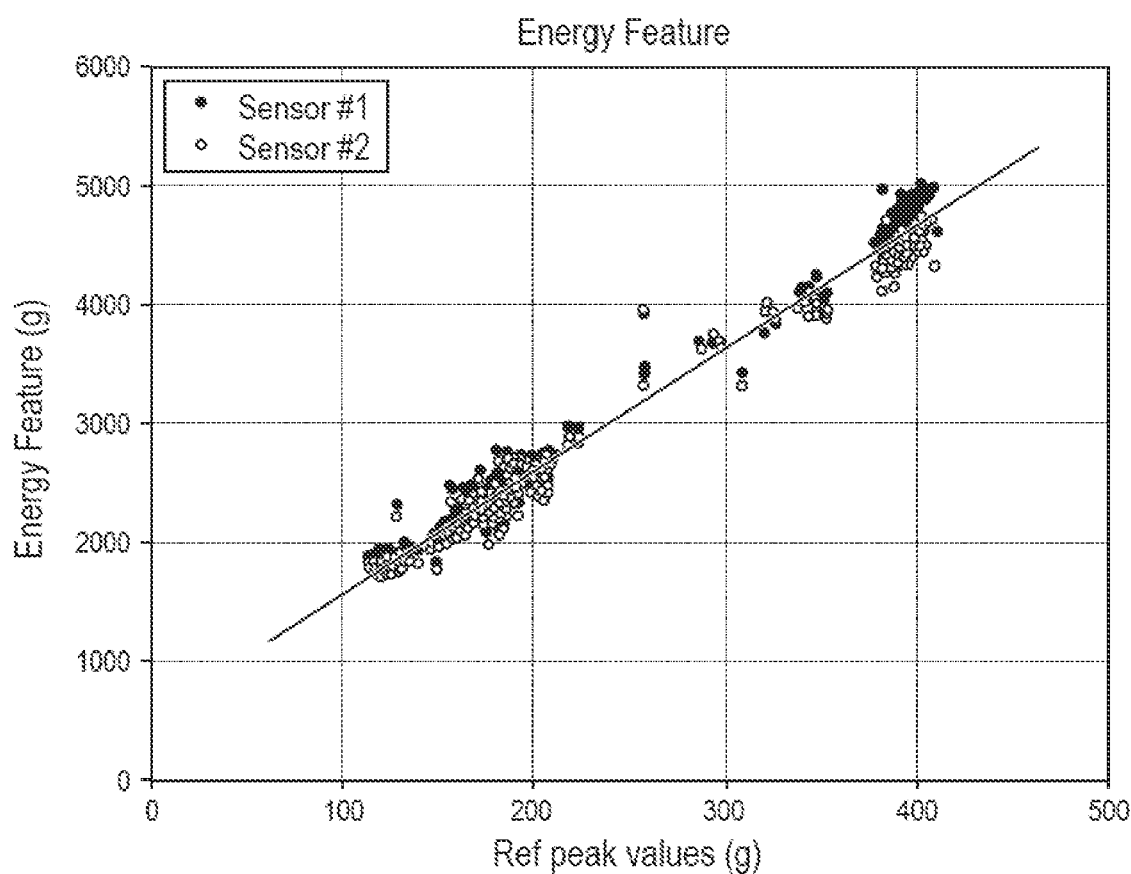
FIG. 11 shows a plot of a shock energy value with respect to a reference peak value along the Z axis.
Figure 12:
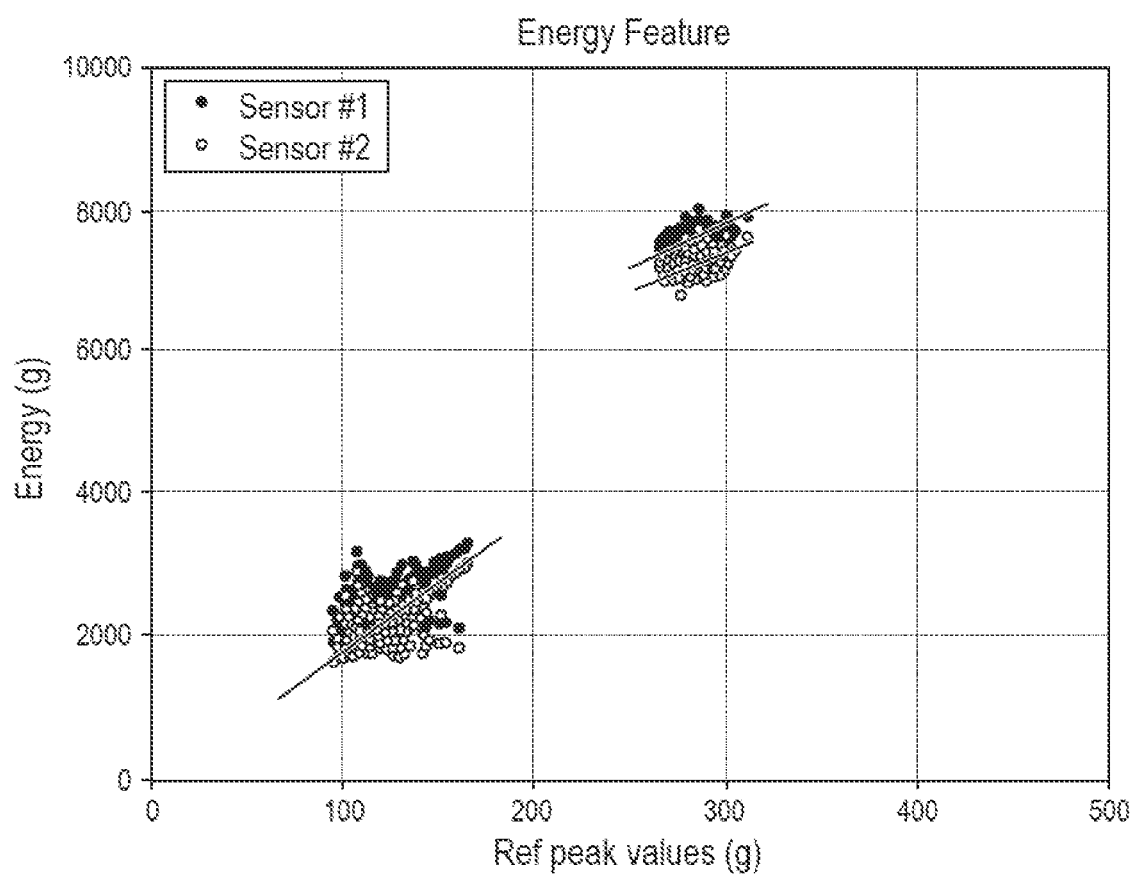
FIG. 12 shows a plot of a shock energy value with respect to a reference peak value along the X axis for when the amplitude along the X axis becomes saturated.

FIG. 11 shows a plot of the shock energy value with respect to the reference peak value along the Z axis. FIG. 12 shows a plot of the shock energy value with respect to the reference peak value along the X axis for when the amplitude along the X axis becomes saturated.

When data preprocessing is done, feature extraction is performed to reduce a dimension for input to the ML model and provide an input that is less sensitive to a shape of the waveform. Further, by reducing the input, the ML model may be smaller and simpler.

A shock waveform may be characterized by an amplitude of a signal. Shock absorption is highly dependent on a mounting of the sensor and a mechanical response from equipment. An aim is to have a mechanical transmissibility of 1. Depending on an application, the waveform could be damped or very resonant. Embodiments are designed to be immune to multiple mechanical responses by normalizing RMS by a square root of the shock energy.

Figure 13:
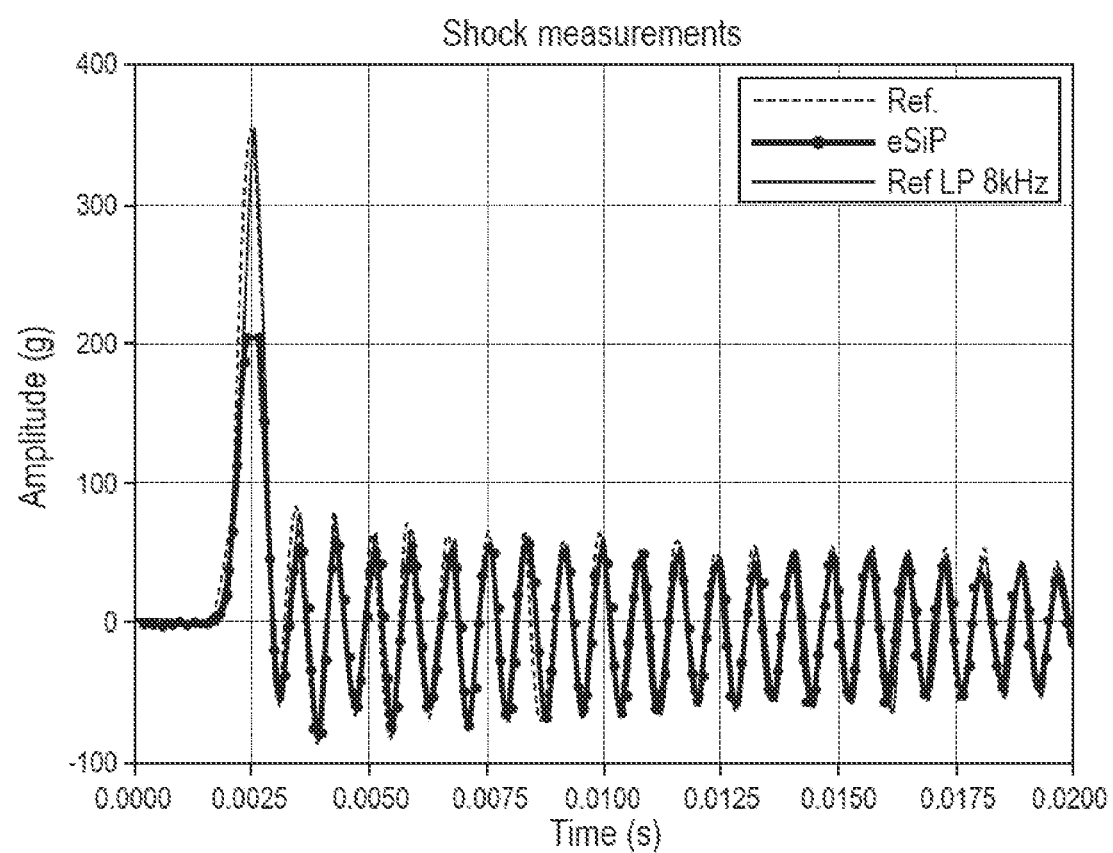
FIG. 13 shows an example waveform with low absorption.
Figure 14:
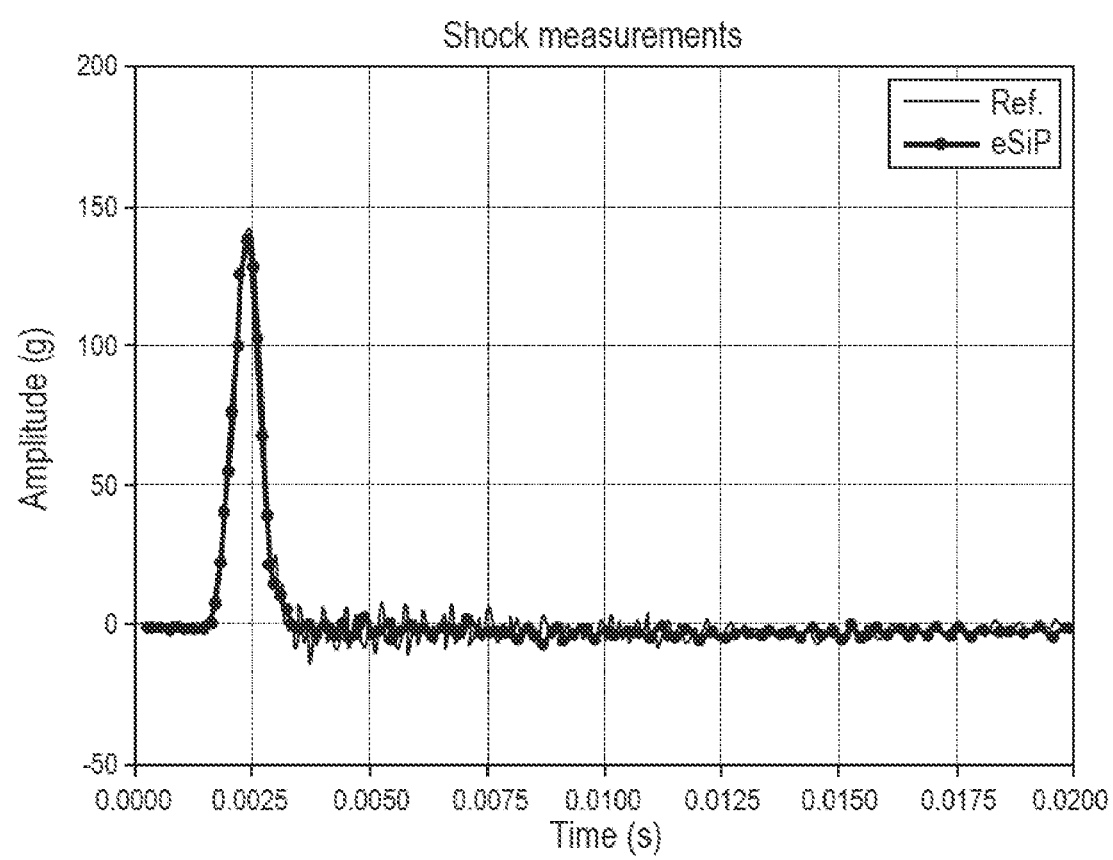
FIG. 14 shows an example waveform with high absorption.

FIG. 13 shows an example waveform with low absorption (resonant). FIG. 14 shows an example waveform with high absorption (high damping). As shown, the waveform of FIG. 13 takes a longer period of time to lose energy than the waveform of FIG. 14.

To minimize an influence of amplitude of the waveform, normalization may be performed. The shock energy computed with data of the three axes includes information related to shock absorption and is correlated to individual preprocessed data for each axis. Another feature, which may become input to a machine learning model, may be extracted and computed by dividing the RMS of the signal of each axis by a square root of the shock energy according to:

$$\text{Input} = \frac{\text{RMS}}{\sqrt{\text{Shock Energy}}} = \frac{\sqrt{\frac{1}{n} \times \left(\sum_{i=0}^{n-1} a_i^2 dt\right)}}{\sum_{i=0}^{n-1} \sqrt{(x_i^2 + y_i^2 + z_i^2)}}$$

By using this normalization, the ML model may have three inputs, one for each axis. The inputs are independent of the signal amplitude and the shape of the waveform. In other embodiments, the model may consider other features independently.

Figure 15:
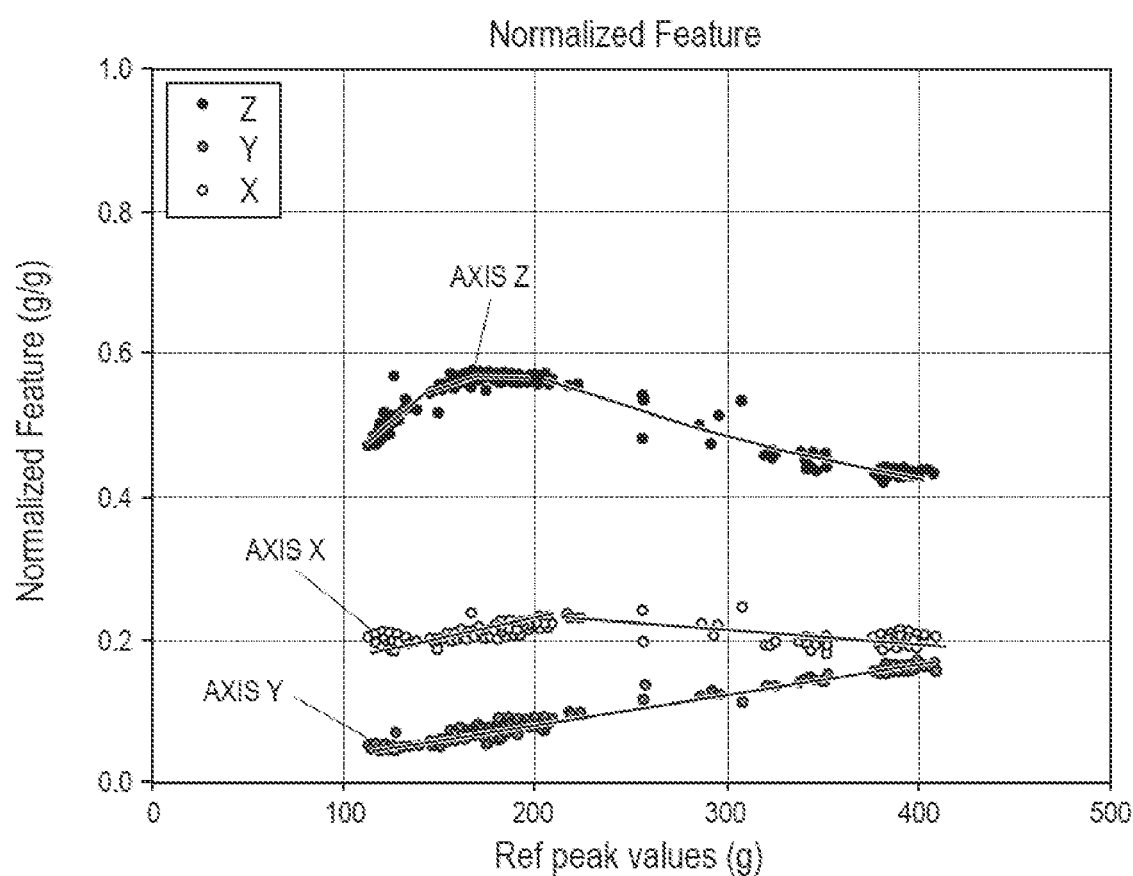
FIG. 15 shows a plot of a normalized feature (input) for various reference peak values when the amplitude along the Z axis becomes saturated.
Figure 16:
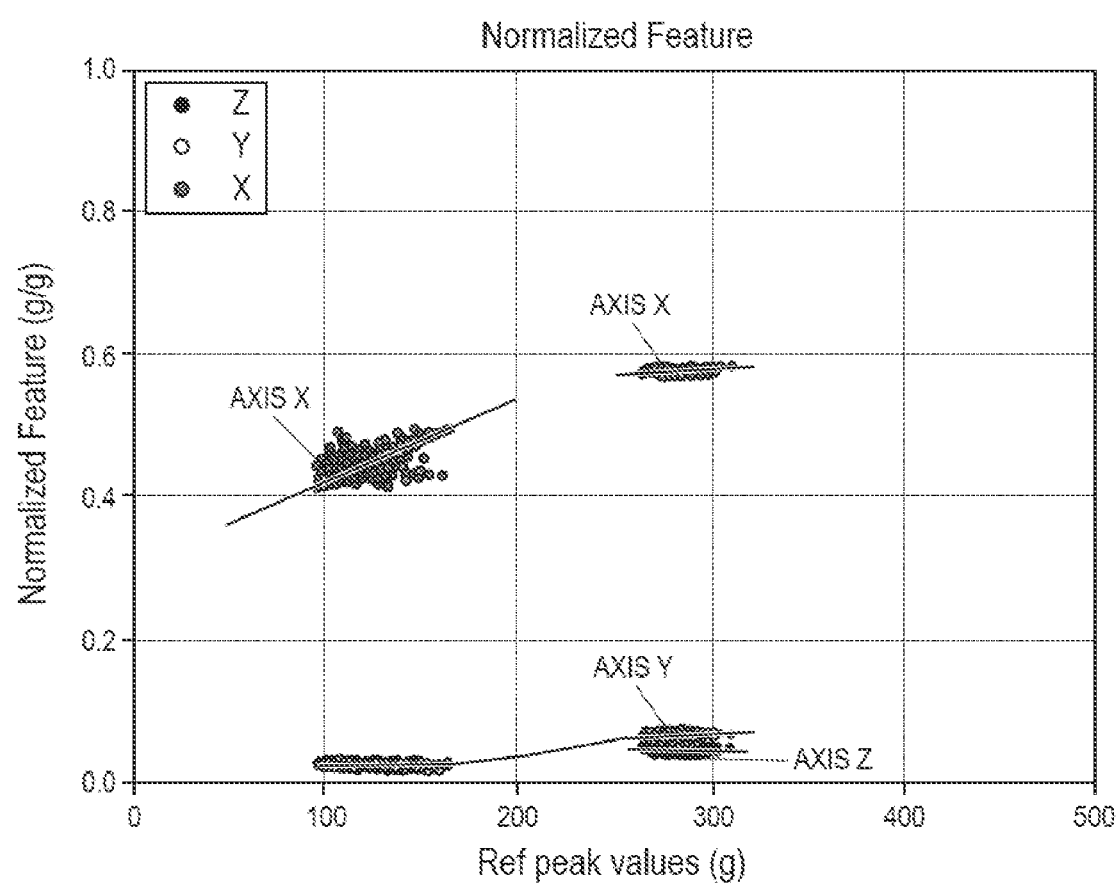
FIG. 16 shows a plot of a normalized feature (input) for various reference peak values when the amplitude along the X axis becomes saturated.

FIGS. 15 and 16 show a plot of a normalized feature (input) for various reference peak values. In FIG. 15, amplitude along the Z axis becomes saturated and in FIG. 16, amplitude along the X axis becomes saturated. The normalized value of the axis being saturated decreases while the normalized value of other axes may increase. This is due to the saturated axis having a lower portion of the shock energy when saturated. The other axes are sensitive to an increase in the actual shock stimuli due to non-saturated vector components in the three-dimensional coordinate system and cross-axis sensitivity of the sensor. Cross-axis sensitivity may be in a range of 1-5% of other axis values.

Modeling

Modeling is based on a supervised machine learning model. Various embodiments have been tested using classification models, which limit computational requirements. In other embodiments, neural networks and other machine ML algorithms may be used for regression models.

A classification model receives values of an input and generates as output a class to which the values belong. For shock and vibration requirements in the oil and gas industry, the typical output classes may be:

Interval 1: 200-250
Interval 2: 250-300
Interval 3: 300-350
Interval 4: 350-500
Interval 5: 500-800

Building Supervised Model

Tests were performed using the sensor 200 and a reference sensor with a higher range that does not become saturated during testing. A shock range was from 50 g to 500 g. Waveforms of 3 axes were acquired during the testing. Outputs of the unsaturated reference sensor were used to label the data for machine learning. A database stored about 1000 waveforms for each axis and each position of the sensor on a machine receiving a shock.

The database was enhanced using simulations based on experimental tests and geometrical considerations. The simulations populated the database with sensor positions not acquired during the testing. A set of data were generated artificially by applying a rotation matrix to the acquired data during testing. About 1000 waveforms for each axis were artificially generated to complete the database without experiments. In some embodiments, the database may be populated based on 10 degree increments on each axis. Using this strategy, the database was populated with about 50,000,000 waveforms per axis. The database was split into two portions, one portion for training the model and another portion for testing, or validating, the model.

Figure 17:
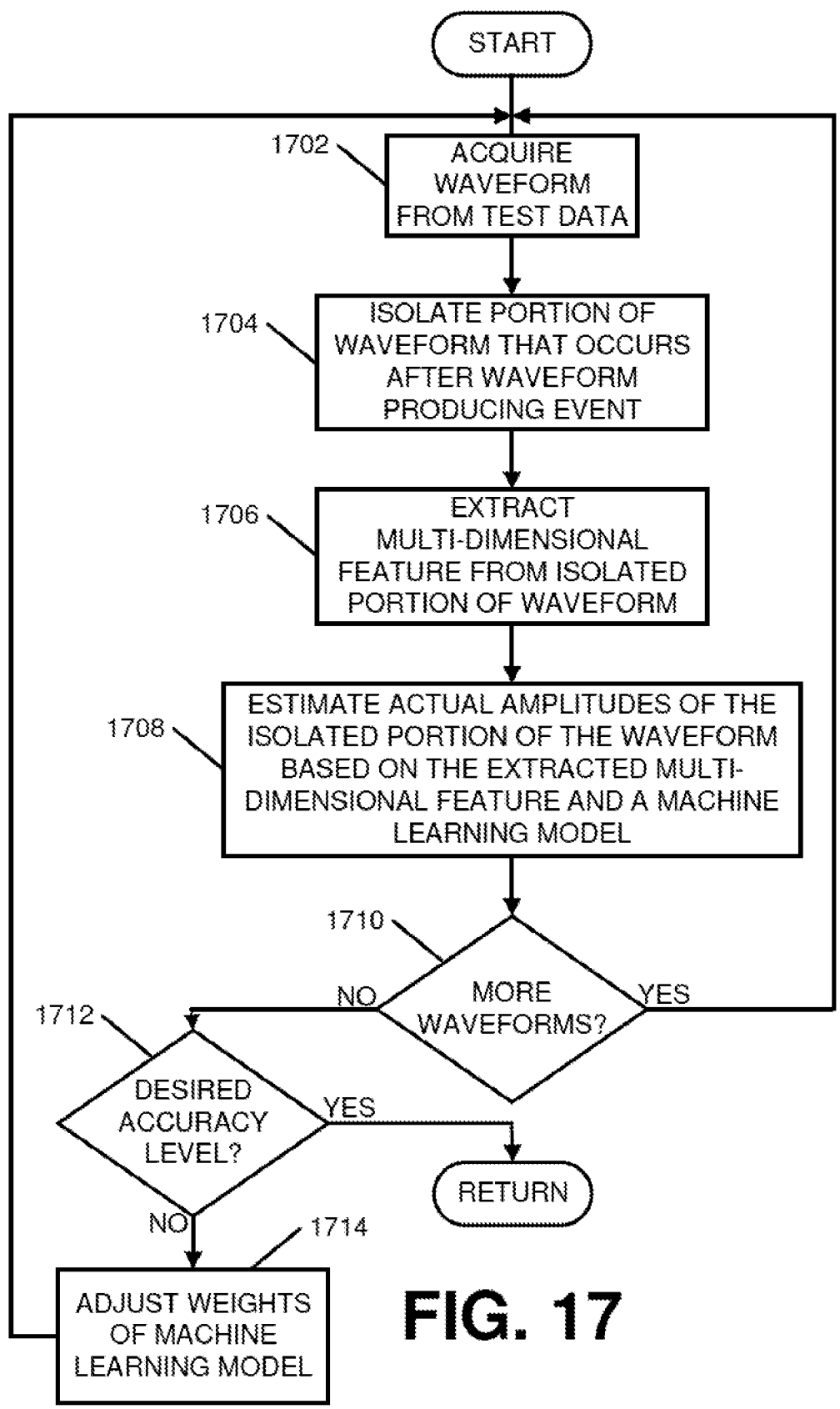
FIG. 17 is a flowchart illustrating an example process for training an ML model.

FIG. 17 is a flowchart of an example process for training an ML model using supervised learning. The process may begin with acquiring a waveform from test data (act 1702). Next, a portion of the waveform that occurs later in time (after) a waveform producing event (e.g., a shock) may be isolated (act 1704). A multi-dimensional feature such as, for example, RMS or Shock Energy, then may be extracted from the isolated portion of the waveform (act 1706). In some embodiments, the multi-dimensional feature may be $$\frac{RMS}{\sqrt{Shock\ Energy}}$$

for each axis. The multi-dimensional feature may be provided as input to the fully trained ML model, which may provide an estimate of an amplitude along an axis that is saturated (act 1708), based on, for example, $$\frac{RMS}{\sqrt{Shock\ Energy}}$$

for the saturated axis. A determination may be made regarding whether any additional waveforms exist in the test data (act 1710).

If more waveforms are determined to exist in the test data, then acts 1702-1710 may be repeated.

If no additional waveforms are determined to exist in the test data, then a determination may be made regarding whether a desired level of accuracy is achieved (act 1712). According to various embodiments, a desired level of accuracy may be determined by calculating residual value based on a difference between reference values and corresponding estimated amplitudes along a saturated axis according to embodiments. If the desired level of accuracy is determined to have been achieved, then the process may be completed. Otherwise, a loss function may be constructed such as, for example, L=|ea−ref|, where L is a loss function, ea is an estimated amplitude value and ref is a reference value. If the desired level of accuracy has not been achieved, the loss function may be back-propagated to adjust weights, or parameters, of the ML model to achieve better accuracy (act 1714). Then, acts 1702-1714 again may be repeated.

Neural Networks

In some embodiments, the ML model may be a neural network, which learns automatically by analyzing training data. As previously mentioned, the training data may be labeled in advance. The neural network is made up of connected neurons, wherein each neuron is a mathematical function that collects and classifies information.

Performance of nodes in neural networks depends on parameters also known as weights. When beginning to train a neural network, all parameters may be set to random values. During the training, the parameters and thresholds may be adjusted after each iteration until the ML model converges.

The most commonly used neural networks for analyzing time series are based on compact one dimensional convolutional layers with few hidden layers. Because of their low computational complexity, neural networks that include one-dimensional convolutional layers are especially useful for solving problems in real time.

A one-dimensional convolution is a simple operation involving two inputs, a matrix and a kernel. The kernel "slides" over one-dimensional input data, performing an element-wise multiplication with a part of the input the kernel is currently operating on. The results are then summed into a single output.

Relu is a piecewise linear function used as an activation function. It is defined as:

$$y=\max(0,x)$$

The activation function is responsible for returning output from an input value. Activation functions introduce non-linearity into the output and enables modeling of complex functions.

An objective of a max pooling function is to group and calculate a maximum value of a given input creating a down sampled feature map, which is usually used after convolution layers.

Linear layers, also known as fully connected layers, may be used at an end of a convolutional neural network to perform either classification or regression. Fully connected layers connect each input neuron to each output neuron and are expressed as $$y=xA^T+b,$$

where y is a convolutional result, x is an input signal, b is an offset, A is a kernel, and $A^T$ represents a transpose of A.

Figure 18:
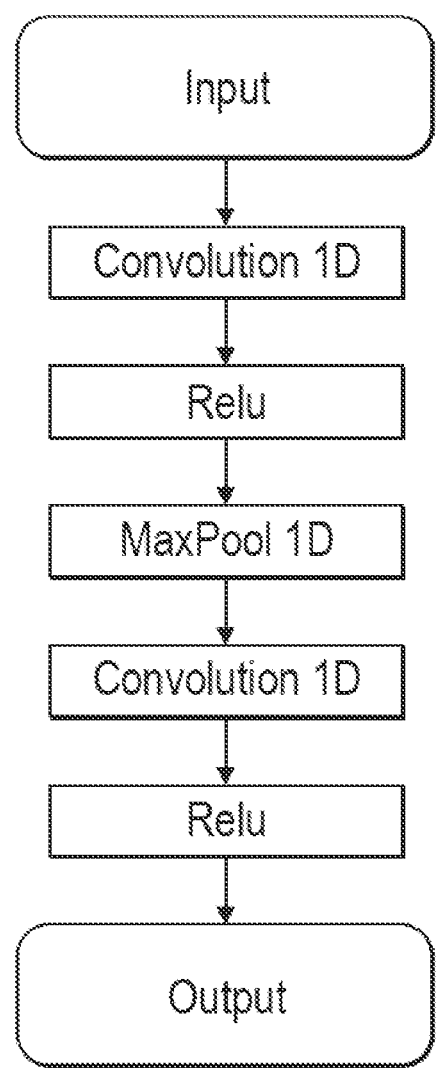
FIG. 18 shows an architecture of an example convolutional neural network that may be used in some embodiments.

One possible architecture of a convolutional network that may be used in various embodiments is shown in FIG. 18. As shown, input is provided to a one-dimensional convolution layer. As previously mentioned, input for each axis may be defined as:

$$\frac{RMS}{\sqrt{Shock\ Energy}}$$

The architecture includes one-dimensional convolutional layers followed by activation functions and grouping (e.g., max pooling) functions. The convolutional layers helps to extract information and a correlation that exists among features extracted in previous steps. The activation functions perform a nonlinear transformation of the input, so that more complex tasks may be learned and performed.

Grid search is a tuning technique that attempts to compute optimum values of hyperparameters. During hyper-optimization, grid search is used to obtain the following hyperparameters for the neural network:

Batch size of length 32
Learning rate to 0.01
Number of iterations equal to 100

A SoftMax cross entropy function may be used as a loss function. An Adam optimizer, in the literature, shows better results for this type of problem compared to other algorithms such as Averaged Stochastic Gradient Descent.

Prediction based on the abovementioned ML model is performed for each new acquired dataset.

Model Implementation Flow for Embedded Systems

Once the ML model is validated, the model may be translated using an automated code generator. The code generator is designed to simplify embedded computations. The features extracted from signals use a dynamic quantization from float32 to int8. Thus, for each waveform the X, Y, and Z axes, related features (RMS, shock energy, and normalized values) are converted to 8 bit integers. Model size is reduced by 25-30% and computations are 2-10 times faster. Model accuracy is degraded by only 1-5%.

The ML model may be defined as a function and compiled with application embedded software.

Figure 19:
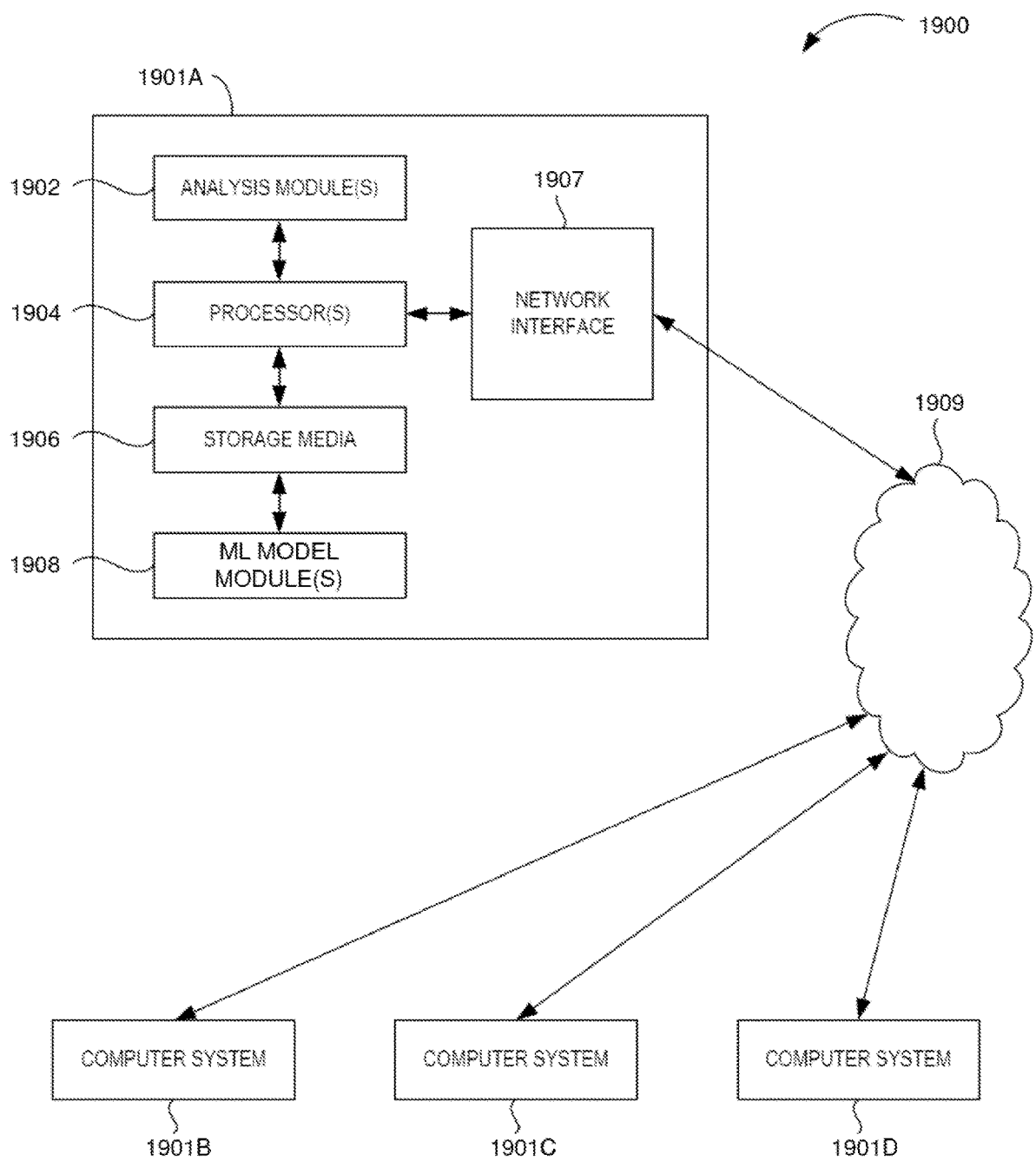
FIG. 19 illustrates a schematic view of a computing system, according to an embodiment.

In some embodiments, the methods of the present disclosure may be executed by a computing system. FIG. 19 illustrates an example of such a computing system 1900, in accordance with some embodiments. The computing system 1900 may include a computer or computer system 1901A, which may be an individual computer system 1901A or an arrangement of distributed computer systems. The computer system 1901A includes one or more analysis modules 1902 that are configured to perform various tasks according to some embodiments, such as one or more methods disclosed herein. To perform these various tasks, the analysis module 1902 executes independently, or in coordination with, one or more processors 1904, which is (or are) connected to one or more storage media 1906. The processor(s) 1904 is (or are) also connected to a network interface 1907 to allow the computer system 1901A to communicate over a data network 1909 with one or more additional computer systems and/or computing systems, such as 1901B, 1901C, and/or 1901D (note that computer systems 1901B, 1901C and/or 1901D may or may not share the same architecture as computer system 1901A, and may be located in different physical locations, e.g., computer systems 1901A and 1901B may be located in a processing facility, while in communication with one or more computer systems such as 1901C and/or 1901D that are located in one or more data centers, and/or located in varying countries on different continents).

A processor may include a microprocessor, microcontroller, processor module or subsystem, programmable integrated circuit, programmable gate array, or another control or computing device.

The storage media 1906 may be implemented as one or more computer-readable or machine-readable storage media. Note that while in the example embodiment of FIG. 19 storage media 1906 is depicted as within computer system 1901A, in some embodiments, storage media 1906 may be distributed within and/or across multiple internal and/or external enclosures of computing system 1901A and/or additional computing systems. Storage media 1906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 1900 contains one or more ML model module(s) 1908. In the example of computing system 1900, computer system 1901A includes the ML module 1908. In some embodiments, a single ML module may be used to perform some aspects of one or more embodiments of the methods disclosed herein. In other embodiments, a plurality of ML model modules 1908 may be used to perform some aspects of methods herein.

It should be appreciated that computing system 1900 is merely one example of a computing system, and that computing system 1900 may have more or fewer components than shown, may combine additional components not depicted in the example embodiment of FIG. 19, and/or computing system 1900 may have a different configuration or arrangement of the components depicted in FIG. 19. The various components shown in FIG. 19 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 1900, FIG. 19), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

Although the abovementioned embodiments describe a shock sensor with an embedded system, other embodiments may include a different type of sensor with an embedded system such as for example, gyroscopes (for torsional acceleration and shocks), pressure sensors (for hydraulic fracking and perforating guns), hydrophone/geophone (for large seismic events), acoustic receivers (for sonar pulses, acoustic telemetry or triggers). Also, in other embodiments, different types of features may be extracted for input to a ML model such as, for example, a shock pulse envelope, quality or damping factors from a pulse acquisition, second, third, fourth or fifth non-saturated peaks from a pulse, power spectral density from a Fast Fourier Transform, pearson correlation, maximum derivative value from low-pass filtered waveforms (after smoothing the waveforms), saturation duration, a number of saturations in a signal, etc.

The invention claimed is:

1. A computer-implemented method for estimating actual amplitudes of a waveform, the computer-implemented method comprising:
    training a machine learning model for an embedded system of a first three-axes sensor having a limited dynamic range to estimate the actual amplitudes of a waveform that saturates the first three-axes sensor in a direction of one of the three axes;
    acquiring, by the embedded system, a second waveform during use of a tool including the first three-axes sensor;
    isolating, by the embedded system, the second waveform that occurs after a second waveform producing event;
    extracting, by the embedded system, a multi-dimensional feature from the isolated second waveform; and
    estimating, by the embedded system using the machine learning model, the actual amplitudes of the second waveform based on the extracted multi-dimensional feature.

2. The computer-implemented method of claim 1, wherein the training of the machine learning model of the embedded system further comprises:
    acquiring, by the machine learning model for the embedded system, the waveform from test data, the waveform including first amplitudes of the waveform from the first three-axes sensor, the test data further including actual amplitudes of the waveform from a second three-axes sensor having a broader dynamic range than the first three-axis sensor, and that, in the test data, did not get saturated along any of the three axes directions;
    isolating, by the embedded system, the waveform of the first three-axes sensor that occurs after a waveform producing event,
    extracting, by the embedded system, a multi-dimensional feature from the isolated waveform,
    estimating, by the embedded system using the machine learning model, the actual amplitudes of the waveform based on the extracted multi-dimensional feature, and
    repeating the acquiring, the isolating, and the extracting for a next waveform from the test data until all of the waveforms including the first amplitudes have been acquired by the machine learning model,
    adjusting weights of the machine learning model to reduce an error between the estimated actual amplitudes of the waveform and the corresponding actual amplitudes of the waveform, and
    repeating the acquiring, the isolating, the extracting, the estimating, the repeating of the acquiring, and the adjusting weights until a desired level of accuracy of the estimated actual amplitudes is achieved.

3. The computer-implemented method of claim 1, further comprising:
    performing low-pass filtering using either a sliding average or a Butterworth filter up to a sixth order.

4. The computer-implemented method of claim 1, wherein the extracting the multi-dimensional feature from the isolated second waveform comprises:
    calculating a root mean square of the isolated second waveform in each of the axial directions.

5. The computer-implemented method of claim 4, wherein:
    the second waveform producing event is a shock, and
    the extracting the multi-dimensional feature from the isolated second waveform comprises:
        calculating a shock energy of the second waveform based on a sum of the root mean square in all of the three axes for data points of the second waveform.

6. The computer implemented method of claim 5, further comprising:
    calculating, by the embedded system, inputs to the machine learning model based on a root mean square in each of the three axial directions divided by a square root of the shock energy.

7. The computer-implemented method of claim 1, wherein the machine learning model is a convolutional neural network including one-dimensional convolutional layers followed by activation functions and grouping functions.

8. A three-axes sensor for estimating actual amplitudes of a waveform, the three-axes sensor having a limited dynamic range and comprising:
    a microcontroller unit including a memory having instructions recorded therein for the microcontroller unit, when executed by the microcontroller unit, the microcontroller unit performs operations comprising:
        acquiring, by an embedded system of the microcontroller unit, a waveform during use of a tool including the three-axes sensor;
        isolating, by the embedded system, the waveform that occurs after a waveform producing event;
        extracting, by the embedded system, a multi-dimensional feature from the isolated waveform; and
        estimating, by the embedded system using a machine learning model, the actual amplitudes of the waveform based on the extracted multi-dimensional feature.

9. The three-axes sensor of claim 8, wherein the operations further comprise:
    performing low-pass filtering using either a sliding average or a Butterworth filter up to a sixth order.

10. The three axes sensor of claim 8, wherein the extracting the multi-dimensional feature from the isolated waveform comprises:
    calculating a root mean square of the isolated waveform in each axial direction.

11. The three-axes sensor of claim 10, wherein:
    the waveform producing event is a shock, and
    the extracting the multi-dimensional feature from the isolated waveform comprises:
        calculating a shock energy of the waveform based on a sum of the root mean square in the each axial direction for data points of the waveform.

12. The three-axes sensor of claim 11, wherein the operations further comprise:
    calculating, by the embedded system, inputs to the machine learning model based on a root mean square in the each axial direction divided by a square root of the shock energy.

13. The three-axes sensor of claim 8, wherein the machine learning model is a convolutional neural network including one-dimensional convolutional layers followed by activation functions and grouping functions.

14. A non-transitory computer-readable storage medium having instructions recorded thereon for a microcontroller, when the instructions are executed by the microcontroller, the microcontroller performs operations comprising:
acquiring a waveform during use of a tool including a three-axes sensor that further includes the microcontroller, the three-axes sensor having a limited dynamic range;
isolating the waveform that occurs after a waveform producing event;
extracting a multi-directional feature from the isolated waveform; and
estimating, using a machine learning model, actual amplitudes of the waveform based on the extracted multi-directional feature.

15. The non-transitory computer-readable storage medium of claim 14, wherein the operations further comprise:
performing low-pass filtering using either a sliding average or a Butterworth filter up to a sixth order.

16. The non-transitory computer-readable storage medium of claim 14, wherein the extracting the multi-dimensional feature from the isolated waveform comprises:
calculating a root mean square of the isolated waveform in each axial direction.

17. The non-transitory computer-readable storage medium of claim 16, wherein:
the waveform producing event is a shock, and
the extracting the multi-dimensional feature from the isolated waveform comprises:
calculating a shock energy of the waveform based on a sum of the root mean square in the each axial direction for data points of the waveform.

18. The non-transitory computer-readable storage medium of claim 17, wherein the operations further comprise:
calculating inputs to the machine learning model based on a root mean square in the each axial direction divided by a square root of the shock energy.

19. The non-transitory computer-readable storage medium of claim 14, wherein the machine learning model is a convolutional neural network including one-dimensional convolutional layers followed by activation functions and grouping functions.

20. The non-transitory computer-readable storage medium of claim 14, wherein the machine learning model includes a classification model to limit computational requirements.

* * * * *